US011124022B2

(12) United States Patent
Xu et al.

(10) Patent No.: US 11,124,022 B2
(45) Date of Patent: Sep. 21, 2021

(54) DEVICE FOR REMOVING BURRS FROM BACK CAVITY OF WHEEL

(71) Applicant: CITIC DICASTAL CO., LTD, Hebei (CN)

(72) Inventors: Zuo Xu, Hebei (CN); Bowen Xue, Hebei (CN); Hongbao Wang, Hebei (CN); Jiandong Guo, Hebei (CN)

(73) Assignee: CITIC DICASTAL CO., LTD, Hebei (CN)

( * ) Notice: Subject to any disclaimer, the term of this patent is extended or adjusted under 35 U.S.C. 154(b) by 123 days.

(21) Appl. No.: 16/574,938

(22) Filed: Sep. 18, 2019

(65) Prior Publication Data
US 2020/0171882 A1 Jun. 4, 2020

(30) Foreign Application Priority Data
Nov. 6, 2018 (CN) .......................... 201811313318.X (51) Int. Cl.
*B60B 30/08* (2006.01)
(52) U.S. Cl.
CPC .......... *B60B 30/08* (2013.01); *B23P 2700/50* (2013.01); *B60B 2310/612* (2013.01); *B60B 2340/18* (2013.01); *B60B 2340/32* (2013.01)
(58) Field of Classification Search
CPC ............. B60B 30/08; B60B 2310/612; B60B 2340/18; B60B 2340/32; B60B 30/06; B60B 9/04; B60B 27/0076; B60B 41/02; B60B 41/067; B60B 45/003; B60B 47/08; B60B 47/12; B60B 55/00; B23P 2700/50
See application file for complete search history.

(56) References Cited

U.S. PATENT DOCUMENTS

| 2017/0209976 | A1* | 7/2017 | Xue | .......................... B24B 9/04 |
| 2017/0348781 | A1* | 12/2017 | Xue | ....................... B23D 79/04 |
| 2017/0348816 | A1* | 12/2017 | Xue | ....................... B24B 41/06 |
| 2018/0147685 | A1* | 5/2018 | Xue | ....................... B24B 47/12 |
| 2019/0291235 | A1* | 9/2019 | Xue | ....................... B24B 29/04 |

\* cited by examiner

*Primary Examiner* — Rick K Chang
(74) *Attorney, Agent, or Firm* — Cooper Legal Group, LLC (57) ABSTRACT

A device for removing burrs from a back cavity of a wheel includes a lower lifting synchronous movement arrangement, an outer ring brush arrangement, an inner ring brush arrangement, a synchronous movement arrangement and an upper lifting drive arrangement. When the device is used, an upper cylinder drives four clamping blocks to clamp the wheel synchronously through an upper guide rail, an upper gear and upper racks; an upper cylinder drives the wheel to rise and separate from a roller bed through upper guide pillars and upper guide sleeves; an upper servo motor drives the clamped wheel to rotate through an upper rotating ring. The present invention can be used for not only polishing the burrs at the back cavity of the wheel, but also accurately adjusting the position of each brush according to the flange size and the back cavity diameter of the wheel.

1 Claim, 4 Drawing Sheets

DEVICE FOR REMOVING BURRS FROM BACK CAVITY OF WHEEL

CROSS REFERENCE TO RELATED APPLICATION

This application claims priority to Chinese Patent Application No. 201811313318.X, entitled DEVICE FOR REMOVING BURRS FROM BACK CAVITY OF WHEEL and filed on Nov. 6, 2018, which is incorporated herein by reference for all purpose.

FIELD OF THE INVENTION

The present invention relates to a burr removing device, and specifically relates to a device for removing burrs from a back cavity of a wheel.

BACKGROUND OF THE INVENTION

In the machining process of a wheel, a lot of burrs are inevitably produced in the back cavity of the wheel. If these burrs are not removed in time, the subsequent coating effect will be seriously affected, and the wheel will be corroded in advance during driving. In order to effectively remove the burrs from the back cavity of the wheel, a device for brushing burrs with brush is generally selected. Since most manufacturers use mixed-line production, wheels having different flange sizes and different back cavity diameters are simultaneously circulated on the production line. However, no flexible burr removing device that can use this mixed-line production is present in the present industry.

SUMMARY OF THE INVENTION

The present invention is directed to provide a device for removing burrs from a back cavity of a wheel, which can be used for not only polishing the burrs at the back cavity of the wheel, but also accurately adjusting the position of each brush according to the flange size and the back cavity diameter of the wheel.

In order to achieve the above objective, the technical solution of the present invention is, a device for removing burrs from a back cavity of a wheel, comprises a frame, lower guide pillars, lower guide sleeves, a lower fixed plate, a first lower synchronous belt, a lower lifting plate, a first lower cylinder, a first lower rotary joint, a first lower pulley, a first lower spline shaft, a first lower spline sleeve, a first lower bearing block, a second lower pulley, a first lower anti-rotation pin, a second lower shaft, a second lower bearing block, a lower gear, second lower cylinders, second lower rotary joints, second lower spline shafts, third lower pulleys, second lower spline sleeves, third lower bearing blocks, lower brackets, second lower anti-rotation pins, first lower left guide rails, second lower left guide rails, first lower bottom plates, left support blocks, left servo motors, first left pulleys, first left cylinders, a first left synchronous belt, left rotary joints, second left pulley, first left brackets, left spline shafts, left spline sleeves, second left cylinders, a left fixed plate, a left rotating ring, a left pressing claw, a first left bearing block, third left pulley, second left synchronous belts, second left shafts, second left bearing blocks, left bearings, first left brushes, second left brackets, a left rotating plate, fourth left pulleys, left anti-rotation pins, left clamping blocks, second left brushes, third left shafts, third left bearing blocks, fifth left pulleys, left racks, left gears, fifth right pulleys, third right bearing blocks, third right shafts, a second right brush, right clamping blocks, right anti-rotation pins, a fourth right pulley, right rotating plates, second right brackets, a first right brush, a right bearing, a second right bearing block, second right shafts, second right synchronous belts, third right pulleys, a first right bearing block, right pressing claws, right rotating rings, right fixed plates, second right cylinders, right spline sleeves, right spline shafts, first right brackets, second right pulleys, right rotary joints, first right synchronous belts, first right cylinders, first right pulleys, right servo motors, right support blocks, second right lower guide rails, fourth lower bearing blocks, fourth lower shafts, clamping blocks, an upper gear, upper racks, a first upper cylinder, an upper guide rail, a left sliding plate, an upper fixed plate, an upper rotating ring, an upper lifting plate, an upper servo motor, upper guide pillars, a second upper cylinder, upper guide sleeves, a right sliding plate, lower racks, a second lower synchronous belt, a fourth lower pulley, a lower servo motor and a third lower cylinder.

A lower lifting synchronous movement system comprises: four lower guide sleeves which are fixed on the lower fixed plate; four lower guide pillars which are fitted with the four lower guide sleeves and fixed on the lower lifting plate; two of the third lower cylinders which are also fixed on the lower fixed plate, with output ends of the two third lower cylinders being articulated with a lower part of the lower lifting plate; the first lower bearing block which is fixed below the lower lifting plate; the first lower spline sleeve which is mounted inside the first lower bearing block through a bearing; the second lower pulley which is fixed above the first lower spline sleeve; the first lower pulley which is fixed below the first lower spline sleeve; the first lower spline shaft which is fitted with the first lower spline sleeve; the first lower anti-rotation pin which is fixed above the first lower spline shaft, with a lower end of the first lower spline shaft being connected to an upper end of the first lower rotary joint; the first lower cylinder which is fixed to a bottom end of the first lower bearing block, with an output end of the first lower cylinder being connected to a lower end of the first lower rotary joint; the second lower bearing block which is fixed above the lower lifting plate; the second lower shaft which is mounted inside the second lower bearing block through a bearing; with a lower end of the second lower shaft having an open slot that cooperates with the first lower anti-rotation pin; the lower gear which is fixed to a top end of the second lower shaft; four lower racks which are respectively fixed to the first lower bottom plate and simultaneously mesh with the lower gear; the lower servo motor which is fixed below the lower lifting plate through a transition flange, with the fourth lower pulley being fixed at an output end of the lower servo motor; the first lower pulley which is connected with the fourth lower pulley through the second lower synchronous belt.

A synchronous movement system comprises: the third lower bearing block which is fixed below the first lower bottom plate; the second lower spline sleeve which is mounted inside the third lower bearing block through a bearing; the third lower pulley which is fixed below the second lower spline sleeve; the second lower spline shaft which cooperates with the second lower spline sleeve; the second lower anti-rotation pin which is fixed to a top end of the second lower spline shaft, with a lower part of the second lower spline shaft being connected to a top end of the second lower rotary joint; the lower bracket which is fixed below the first lower bottom plate; the second lower cylinder which is fixed above a bottom plate of the lower bracket, with an output end of the second lower cylinder being connected to a lower part of the second lower rotary joint; the fourth lower bearing block which is fixed above the first lower bottom plate; the fourth lower shaft which is mounted inside the fourth lower bearing block through a bearing; the left gear which is fixed to a top end of the fourth lower shaft; two left racks which are respectively fixed to the left support block and the right support block, and simultaneously mesh with the left gear, wherein a lower end of the fourth lower shaft has an open slot to cooperate with the second lower anti-rotation pin; the first lower bottom plate which is mounted to an upper end of the lower lifting plate through the first lower left guide rail; the second lower pulley and the third lower pulley are connected by the first lower synchronous belt.

An outer ring brush system comprises: the left support block which is mounted to a top end of the first lower bottom plate through the second left lower guide rail; the left fixed plate which is fixed to an upper end of the left support block; the first left bearing block which is fixed above the left fixed plate; the left spline sleeve which is mounted inside the first left bearing block through a bearing; the fourth left pulley which is fixed to a top end of the left spline sleeve; the second left pulley which is fixed to a lower end of the left spline sleeve; the left spline shaft which cooperates with the left spline sleeve; the left anti-rotation pin which is fixed to a top end of the left spline shaft, with a lower end of the left spline shaft being connected to a top end of the left rotary joint; the first left bracket which is fixed below the left fixed plate; the first left cylinder which is fixed above a bottom plate of the left fixed plate, with an output end of the first left cylinder being connected with a lower end of the left rotary joint; the left servo motor which is fixed below the left fixed plate through a transition flange, with the first left pulley being fixed to an output end of the left servo motor, wherein the first left pulley and the second left pulley are connected by the first left synchronous belt; the second left bracket which is mounted to a top end of the left fixed plate through the left rotating ring; the second left cylinder which is fixed to the left fixed plate, with the left pressing claw being fixed to an output end of the second left cylinder; the left pressing claw which cooperates with an upper end face of a flange below the second left bracket; the left rotating plate which is fixed to a top end of the second left bracket; the left clamping block which is fixed to a lower end of the left rotating plate and has an open slot to cooperate with the left anti-rotation pin; the second left bearing block which is fixed to a left side of the left rotating plate; the second left shaft which is mounted inside the second left bearing block through the left bearing; the first left brush which is fixed to an upper end of the second left shaft; the third left pulley which is fixed to a lower end of the second left shaft; the third left bearing block which is fixed to a right side of the left rotating plate; the third left shaft which is mounted inside the third left bearing block through a bearing; the second left brush which is fixed above the third left shaft; the fifth left pulley which is fixed below the third left shaft, wherein the third left pulley, the fourth left pulley and the fifth left pulley which are connected by the second left synchronous belt.

An inner ring brush system comprises: the right support block which is mounted above a right side of the first lower bottom plate through the second right lower guide rail; the right fixed plate which is fixed above the right support block; the first right bearing block which is fixed above the right fixed plate; the right spline sleeve which is mounted inside the first right bearing block through a bearing; the fourth right pulley which is fixed above the right spline sleeve; the second right pulley which is fixed below the right spline sleeve; the right spline shaft which cooperates with the right spline sleeve; the right anti-rotation pin which is fixed to a top end of the right spline shaft, with a lower end of the right spline shaft being connected to an upper end of the right rotary joint; the first right bracket which is fixed below the right fixed plate; the first right cylinder which is fixed above a bottom end of the first right bracket, with an output end of the first right cylinder being connected to an lower end of the right rotary joint; the right servo motor which is fixed to a lower end of the right fixed plate through a transition flange, with the first right pulley being fixed to an output end of the right servo motor; the first right pulley and the second right pulley which are connected by the first right synchronous belt; the second right bracket which is mounted above the right fixed plate through the right rotating ring; the second right cylinder which is fixed to a right side of the right fixed plate; the right pressing claw which is fixed to an output end of the second right cylinder and cooperates with an upper end face of a flange below the second right bracket; the right rotating plate which is fixed to a top end of the second right bracket; the right clamping block which is fixed to a lower end of the right rotating plate, with a lower part of the right clamping block having an open slot to cooperate with the right anti-rotation pin; the third right bearing block which is fixed to a left side of the right rotating plate; the third right shaft which is mounted inside the third right bearing block through a bearing; the second right brush which is fixed to a top end of the third right shaft; the fifth right pulley which is fixed below the third right shaft; the second right bearing block which is fixed to a right side of the right rotating plate; the second right shaft which is mounted inside the second right bearing block through the right bearing; the first right brush which is fixed to a top end of the second right shaft; the third right pulley which is fixed below the second right shaft, wherein the fifth right pulley, the fourth right pulley and the third right pulley which are connected by the second right synchronous belt.

A brush unit comprises the outer ring brush system, the inner ring brush system and the synchronous movement system. The device comprises four brush units uniformly distributed in the circumferential direction.

An upper lifting drive system comprises: four upper guide sleeves which are fixed above a top plate of the frame; four upper guide pillars which are fitted with the four upper guide sleeves and are fixed above the upper lifting plate; the two first upper cylinder which are also fixed above a top plate of the frame, with output ends of the two first upper cylinder being articulated with an upper part of the upper lifting plate; the upper fixed plate which is mounted below the upper lifting plate through the upper rotating ring; the upper servo motor which is fixed above the upper lifting plate, with an output end of the upper servo motor being connected to an upper part of the upper fixed plate; the left sliding plate and the right sliding plate which are respectively mounted below the upper fixed plate through the upper guide rail; the upper gear which is fixed below the upper fixed plate; the upper racks which are fixed to the left sliding plate and the right sliding plate respectively and mesh with the upper gear; the first upper cylinder which is fixed below the upper fixed plate, with an output end of the first upper cylinder being connected to the left sliding plate; and two clamping block which are respectively fixed below the left sliding plate and the right sliding plate.

During operation, the first upper cylinder drives the four clamping block to synchronously clamp a wheel through the upper guide rail, the upper gear and the upper racks; the second upper cylinder lifts the wheel to separate from a roller bed through the upper guide pillars and the upper guide sleeves; the upper servo motor drives the clamped wheel to rotate through the upper rotating ring.

The lower servo motor drives the first lower spline sleeve and the first lower spline shaft to rotate through the first lower pulley, the fourth lower pulley and the second lower synchronous belt; the first lower cylinder drives the first lower spline shaft to rise, and the first lower anti-rotation pin cooperates with the open slot at the lower end of the second lower shaft to drive the second lower shaft and the lower gear to rotate; the positions of the four brush units can be synchronously adjusted through the meshing of the lower gear and the lower racks according to the size of a wheel flange.

The left servo motor can drive the left spline sleeve to rotate through the first left pulley, the second left pulley and the first left synchronous belt; the left spline sleeve drives the fourth left pulley to rotate; the fourth left pulley simultaneously drives the first left brush and the second left brush to rotate through the third left pulley, the fifth left pulley and the second left synchronous belt; the left spline sleeve cooperates with the left spline shaft to drive the left spline shaft to rotate; the first left cylinder drives the left spline shaft to rise, so that the left anti-rotation pin cooperates with the open slot at the lower part of the left clamping block; the second left bracket and the left rotating ring drive the left rotating plate to rotate, so that the positions of the first left brush and the second left brush can be accurately adjusted according to the size of the wheel; after the positions are adjusted, the second left cylinder drives the left pressing claw to press the upper end face of the flange below the second left bracket so as to fix the adjusted positions of the first left brush and the second left brush.

The right servo motor can drive the right spline sleeve to rotate through the first right pulley, the second right pulley and the first right synchronous belt; the right spline sleeve drives the fourth right pulley to rotate; the fourth right pulley can simultaneously drive the first right brush and the second right brush to rotate through the third right pulley, the fifth right pulley and the second right synchronous belt; the right spline sleeve cooperates with the right spline shaft to drive the right spline shaft to rotate; the first right cylinder drives the right spline shaft to rise, so that the right anti-rotation pin cooperates with the open slot below the right clamping block; the second right bracket and the right rotating ring drive the right rotating plate to rotate, so that the positions of the first right brush and the second right brush can be accurately adjusted according to the size of the wheel; after the positions are adjusted, the second right cylinder drives the pressing claw to press the upper end face of the flange below the second right bracket so as to fix the adjusted positions of the first right brush and the second right brush.

The second lower pulley drives the third lower pulley and the second lower spline sleeve to rotate through the first lower synchronous belt; the second lower spline sleeve drives the second lower spline shaft to rotate; the second lower cylinder drives the second lower spline shaft to rise, and the second lower anti-rotation pin cooperates with the open slot at the lower end of the fourth lower shaft; the second lower spline shaft drives the fourth lower shaft and the left gear to rotate; the left gear meshes with the left racks to adjust the positions of the outer ring brush system and the inner ring brush system.

The third lower cylinder drives the four rotating first left brush, second left brush, first right brush and second right brush to rise through the lower guide pillars and the lower guide sleeves, and when the brush contact the back cavity of the wheel, the brush can polish and remove burrs from the back cavity.

The device can be used for not only polishing the burrs at the back cavity of the wheel, but also accurately adjusting the position of each brush according to the flange size and the back cavity diameter of the wheel.

In which: 1—frame, 2—lower guide pillar, 3—lower guide sleeve, 4—lower fixed plate, 5—first lower synchronous belt, 6—lower lifting plate, 7—lower cylinder, 8—first lower rotary joint, 9—first lower pulley, 10—first lower spline shaft, 11—first lower spline sleeve, 12—first lower bearing block, 13—second lower pulley, 14—first lower anti-rotation pin, 15—second lower shaft, 16—second lower bearing block, 17—lower gear, 18—second lower cylinder, 19—second lower rotary joint, 20—second lower spline shaft, 21—third lower pulleys, 22—second lower spline sleeve, 23—third lower bearing block, 24—lower bracket, 25—second lower anti-rotation pin, 26—first lower left guide rail, 27—second lower left guide rail, 28—first lower bottom plate, 29—left support block, 30—left servo motor, 31—first left pulley, 32—first left cylinder, 33—first left synchronous belt, 34—left rotary joint, 35—second left pulley, 36—first left bracket, 37—left spline shaft, 38—left spline sleeve, 39—second left cylinder, 40—left fixed plate, 41—left rotating ring, 42—left pressing claw, 43—first left bearing block, 44—third left pulley, 45—second left synchronous belt, 46—second left shaft, 47—second left bearing block, 48—left bearing, 49—first left brush, 50—second left bracket, 51—left rotating plate, 52—fourth left pulley, 53—left anti-rotation pin, 54—left clamping block, 55—second left brush, 56—third left shaft, 57—third left bearing block, 58—fifth left pulley, 59—left rack, 60—left gear, 61—fifth right pulley, 62—third right bearing block, 63—third right shaft, 64—second right brush, 65—right clamping block, 66—right anti-rotation pin, 67—fourth right pulley, 68—right rotating plate, 69—second right bracket, 70—first right brush, 71—right bearing, 72—second right bearing block, 73—second right shaft, 74—second right synchronous belt, 75—third right pulley, 76—first right bearing block, 77—right pressing claw, 78—right rotating ring, 79—right fixed plate, 80—second right cylinder, 81—right spline sleeve, 82—right spline shaft, 83—first right bracket, 84—second right pulley, 85—right rotary joint, 86—right synchronous belt, 87—first right cylinder, 88—first right pulley, 89—right servo motor, 90—right support block, 91—second right lower guide rail, 92—fourth lower bearing block, 93—fourth lower shaft, 94—clamping block, 95—upper gear, 96—upper rack, 97—first upper cylinder, 98—upper guide rail, 99—left sliding plate, 100—upper fixed plate, 101—upper rotating ring, 102—upper lifting plate, 103—upper servo motor, 104—upper guide pillar, 105—second upper cylinder, 106—upper guide sleeve, 107—right sliding plate, 108—lower rack, 109—lower synchronous belt, 110—fourth lower pulley, 111—lower servo motor, 112—third lower cylinder.

DETAILED DESCRIPTION OF EMBODIMENTS

The details and working conditions of the specific device according to the present invention will be described below in combination with the drawings.

Figure 1:
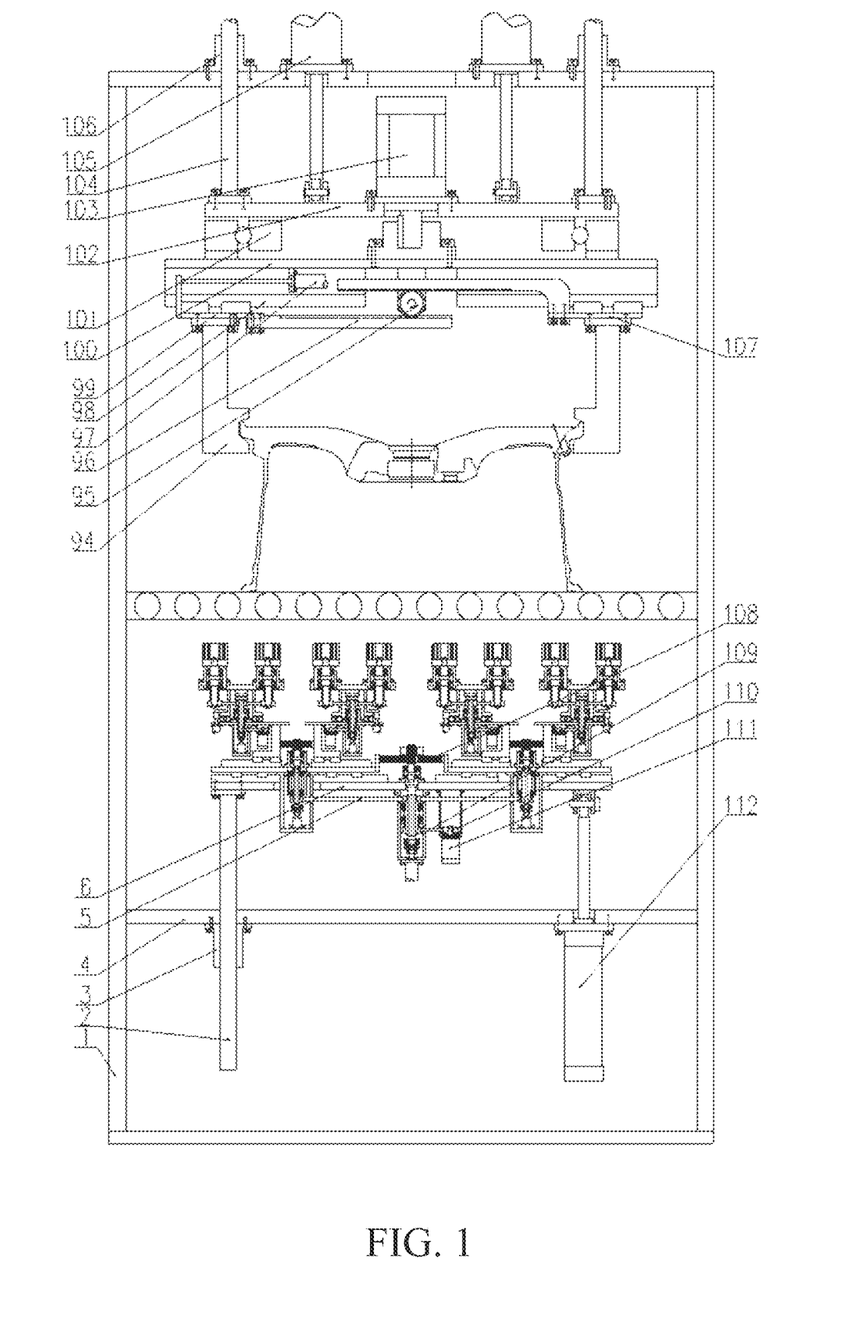
FIG. 1 is a front view of a device for removing burrs from a back cavity of a wheel.
Figure 2:
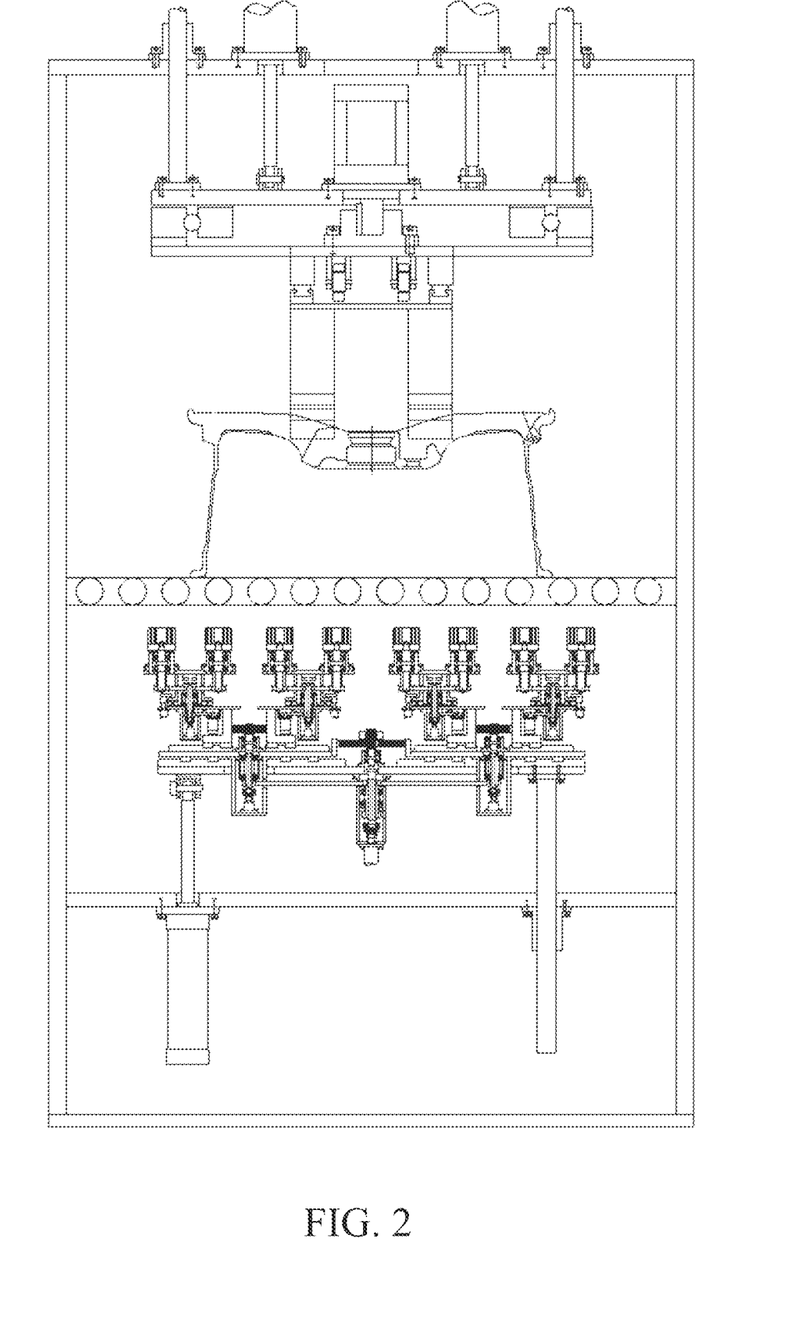
FIG. 2 is a left view of the device for removing burrs from a back cavity of wheel.

The device comprises a frame 1, lower guide pillars 2, lower guide sleeves 3, a lower fixed plate 4, a first lower synchronous belt 5, a lower lifting plate 6, a first lower cylinder 7, a first lower rotary joint 8, a first lower pulley 9, a first lower spline shaft 10, a first lower spline sleeve 11, a first lower bearing block 12, a second lower pulley 13, a first lower anti-rotation pin 14, a second lower shaft 15, a second lower bearing block 16, a lower gear 17, second lower cylinders 18, second lower rotary joints 19, second lower spline shafts 20, third lower pulleys 21, second lower spline sleeves 22, third lower bearing blocks 23, lower brackets 24, second lower anti-rotation pins 25, first lower left guide rails 26, second lower left guide rails 27, first lower bottom plates 28, left support blocks 29, left servo motor 30, first left pulley 31, first left cylinder 32, first left synchronous belts 33, left rotary joints 34, second left pulleys 35, first left brackets 36, left spline shafts 37, left spline sleeves 38, second left cylinders 39, left fixed plates 40, left rotating rings 41, left pressing claws 42, first left bearing block 43, third left pulley 44, second left synchronous belts 45, second left shaft 46, second left bearing blocks 47, left bearings 48, first left brushes 49, second left brackets 50, left rotating plates 51, fourth left pulleys 52, left anti-rotation pins 53, left clamping blocks 54, second left brushes 55, third left shafts 56, third left bearing blocks 57, fifth left pulleys 58, left racks 59, left gears 60, fifth right pulleys 61, third right bearing blocks 62, third right shafts 63, second right brushes 64, right clamping blocks 65, right anti-rotation pins 66, fourth right pulleys 67, right rotating plates 68, second right brackets 69, first right brushes 70, right bearings 71, second right bearing blocks 72, second right shafts 73, second right synchronous belts 74, third right pulleys 75, first right bearing blocks 76, right pressing claws 77, right rotating rings 78, right fixed plates 79, second right cylinders 80, right spline sleeves 81, right spline shafts 82, first right brackets 83, second right pulleys 84, right rotary joints 85, first right synchronous belts 86, first right cylinders 87, first right pulleys 88, right servo motors 89, right support blocks 90, second right lower guide rails 91, fourth lower bearing blocks 92, fourth lower shafts 93, clamping blocks 94, an upper gear 95, upper racks 96, a first upper cylinder 97, an upper guide rail 98, a left sliding plate 99, an upper fixed plate 100, an upper rotating ring 101, an upper lifting plate 102, an upper servo motor 103, upper guide pillars 104, a second upper cylinder 105, upper guide sleeves 106, a right sliding plate 107, lower racks 108, a second lower synchronous belt 109, a fourth lower pulley 110, a lower servo motor 111 and a third lower cylinder 112.

Figure 3:
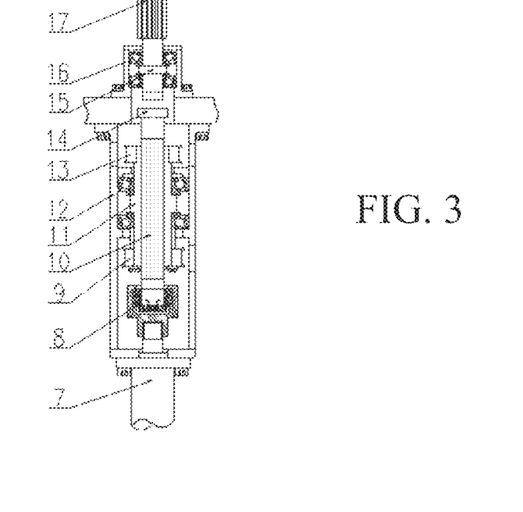
FIG. 3 is a partial front view of a lower lifting synchronous movement of the system device for removing burrs from a back cavity of wheel.

A lower lifting synchronous movement system comprises: four lower guide sleeves 3 which are fixed on the lower fixed plate 4; four lower guide pillars 2 which are fitted with the four lower guide sleeves 3 and are fixed on the lower lifting plate 6; two third lower cylinder 112 which are also fixed on the lower fixed plate 4, with output ends of the two third lower cylinder being articulated with a lower part of the lower lifting plate 6; the first lower bearing block 12 which is fixed below the lower lifting plate 6; the first lower spline sleeve 11 which is mounted inside the first lower bearing block 12 through a bearing; the second lower pulley 13 which is fixed above the first lower spline sleeve 11; the first lower pulley 9 which is fixed below the first lower spline sleeve 11; the first lower spline shaft 10 which is fitted with the first lower spline sleeve 11; the first lower anti-rotation pin 14 which is fixed above the first lower spline shaft 10, with a lower end of the first lower spline shaft 10 being connected to an upper end of the first lower rotary joint 8; the first lower cylinder 7 which is fixed to a bottom end of the first lower bearing block 12, an output end of the first lower cylinder is connected to a lower end of the first lower rotary joint 8; the second lower bearing block 16 which is fixed above the lower lifting plate 6; the second lower shaft 15 which is mounted inside the second lower bearing block 16 through a bearing, with a lower end of the second lower shaft 15 having an open slot that cooperates with the first lower anti-rotation pin 14; the lower gear 17 which is fixed to a top end of the second lower shaft 15; four lower racks 108 which are respectively fixed to the first lower bottom plate 28 and simultaneously mesh with the lower gear 17; the lower servo motor 111 which is fixed below the lower lifting plate 6 through a transition flange, with the fourth lower pulley 110 being fixed at an output end of the lower servo motor 111; the first lower pulley 9 which is connected with the fourth lower pulley 110 through the second lower synchronous belt 109.

Figure 4:
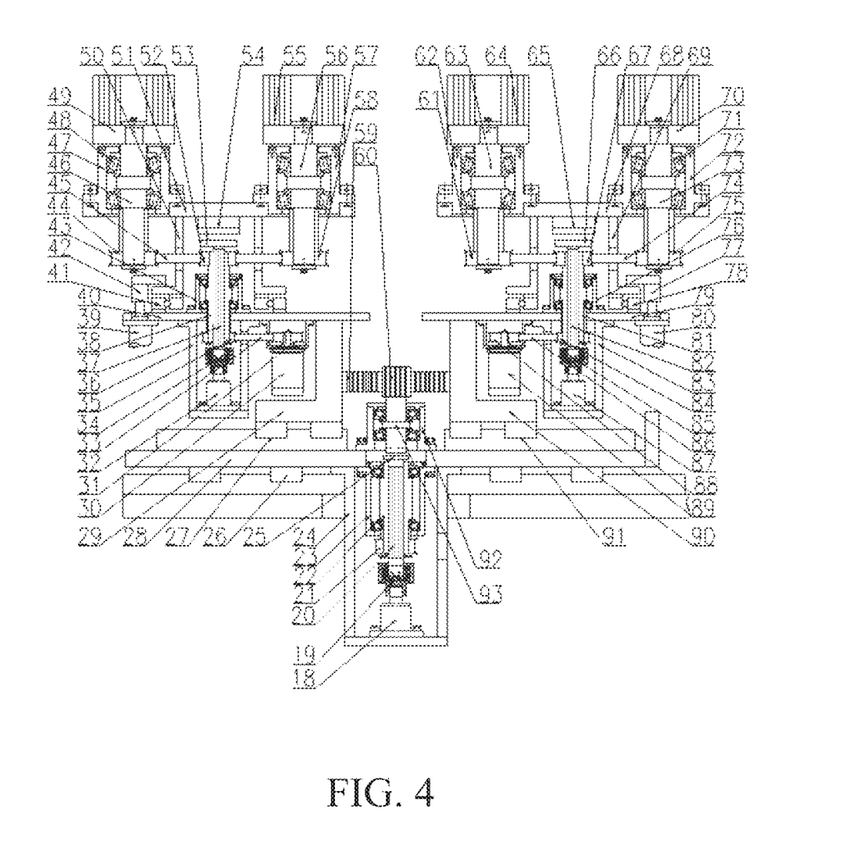
FIG. 4 is a front view of brush units of the device for removing burrs from a back cavity of wheel.

A synchronous movement system comprises: the third lower bearing block 23 which is fixed below the first lower bottom plate 28; the second lower spline sleeve 22 which is mounted inside the third lower bearing block 23 through a bearing; the third lower pulley 21 which is fixed below the second lower spline sleeve 22; the second lower spline shaft 20 which cooperates with the second lower spline sleeve 22; the second lower anti-rotation pin 25 which is fixed to a top end of the second lower spline shaft 20, with a lower part of the second lower spline shaft 20 being connected to a top end of the second lower rotary joint 19; the lower bracket 24 which is fixed below the first lower bottom plate 28; the second lower cylinder 18 which is fixed above a bottom plate of the lower bracket 24, with an output end of the second lower cylinder being connected to a lower part of the second lower rotary joint 19; the fourth lower bearing block 92 which is fixed above the first lower bottom plate 28; the fourth lower shaft 93 which is mounted inside the fourth lower bearing block 92 through a bearing, the left gear 60 which is fixed to a top end of the fourth lower shaft 93; the two left racks 59 which are respectively fixed to the left support block 29 and the right support block 90, and simultaneously mesh with the left gear 60, wherein a lower end of the fourth lower shaft 93 has an open slot to cooperate with the second lower anti-rotation pin 25; the first lower bottom plate 28 which is mounted to an upper end of the lower lifting plate 6 through the first lower left guide rail 26; the second lower pulley 13 and the third lower pulley 21 which are connected by the first lower synchronous belt 5.

An outer ring brush system comprises: the left support block 29 which is mounted to a top end of the first lower bottom plate 28 through the second left lower guide rail 27; the left fixed plate 40 which is fixed to an upper end of the left support block 29; the first left bearing block 43 which is fixed above the left fixed plate 40; the left spline sleeve 38 which is mounted inside the first left bearing block 43 through a bearing; the fourth left pulley 52 which is fixed to a top end of the left spline sleeve 38; the second left pulley 35 which is fixed to a lower end of the left spline sleeve 38; the left spline shaft 37 which cooperates with the left spline sleeve 38; the left anti-rotation pin 53 which is fixed to a top end of the left spline shaft 37, with a lower end of the left spline shaft 37 being connected to a top end of the left rotary joint 34; the first left bracket 36 which is fixed below the left fixed plate 40; the first left cylinder 32 which is fixed above a bottom plate of the left fixed plate 40, with an output end of the first left cylinder being connected with a lower end of the left rotary joint 34; the left servo motor 30 which is fixed below the left fixed plate 40 through a transition flange, with the first left pulley 31 being fixed to an output end of the left servo motor, wherein the first left pulley 31 and the second left pulley 35 are connected by the first left synchronous belt 33; the second left bracket 50 which is mounted to a top end of the left fixed plate 40 through the left rotating ring 41; the second left cylinder 39 which is fixed to the left fixed plate 40, with the left pressing claw 42 being fixed to an output end of the second left cylinder, the left pressing claw 42 cooperates with an upper end face of a flange below the second left bracket 50; the left rotating plate 51 which is fixed to a top end of the second left bracket 50; the left clamping block 54 which is fixed to a lower end of the left rotating plate 51 and has an open slot to cooperate with the left anti-rotation pin 53; the second left bearing block 47 which is fixed to the left side of the left rotating plate 51, the second left shaft 46 is mounted inside the second left bearing block 47 through the left bearing 48; the first left brush 49 which is fixed to an upper end of the second left shaft 46; the third left pulley 44 which is fixed to a lower end of the second left shaft 46; the third left bearing block 57 which is fixed to a right side of the left rotating plate 51, the third left shaft 56 is mounted inside the third left bearing block 57 through a bearing; the second left brush 55 which is fixed above the third left shaft 56; the fifth left pulley 58 which is fixed below the third left shaft 56, wherein the third left pulley 44, the fourth left pulley 52 and the fifth left pulley 58 which are connected by the second left synchronous belt 45.

An inner ring brush system comprises: the right support block 90 which is mounted above the right side of the first lower bottom plate 28 through the second right lower guide rail 91; the right fixed plate 79 which is fixed above the right support block 90; the first right bearing block 76 which is fixed above the right fixed plate 79; the right spline sleeve 81 which is mounted inside the first right bearing block 76 through a bearing; the fourth right pulley 67 which is fixed above the right spline sleeve 81; the second right pulley 84 which is fixed below the right spline sleeve 81; the right spline shaft 82 which cooperates with the right spline sleeve 81; the right anti-rotation pin 66 which is fixed to a top end of the right spline shaft 82, with a lower end of the right spline shaft 82 being connected to an upper end of the right rotary joint 85; the first right bracket 83 which is fixed below the right fixed plate 79; the first right cylinder 87 which is fixed above a bottom end of the first right bracket 83, an output end of the first right cylinder is connected to a lower end of the right rotary joint 85; the right servo motor 89 which is fixed to a lower end of the right fixed plate 79 through a transition flange, with the first right pulley 88 being fixed to an output end of the right servo motor; the first right pulley 88 and the second right pulley 84 which are connected by the first right synchronous belt 86; the second right bracket 69 which is mounted above the right fixed plate 79 through the right rotating ring 78; the second right cylinder 80 which is fixed to a right side of the right fixed plate 79; the right pressing claw 77 which is fixed to an output end of the second right cylinder and cooperates with an upper end face of a flange below the second right bracket 69; the right rotating plate 68 which is fixed to a top end of the second right bracket 69; the right clamping block 65 which is fixed to a lower end of the right rotating plate 68, with a lower part of the right clamping block 65 having an open slot to cooperate with the right anti-rotation pin 66; the third right bearing block 62 which is fixed to a left side of the right rotating plate 68; the third right shaft 63 which is mounted inside the third right bearing block 62 through a bearing; the second right brush 64 which is fixed to a top end of the third right shaft 63; the fifth right pulley 61 which is fixed below the third right shaft 63; the second right bearing block 72 which is fixed to a right side of the right rotating plate 68; the second right shaft 73 which is mounted inside the second right bearing block 72 through the right bearing 71, the first right brush 70 is fixed to a top end of the second right shaft 73; the third right pulley 75 which is fixed below the second right shaft 73, wherein the fifth right pulley 61, the fourth right pulley 67 and the third right pulley 75 which are connected by the second right synchronous belt 74.

Figure 5:
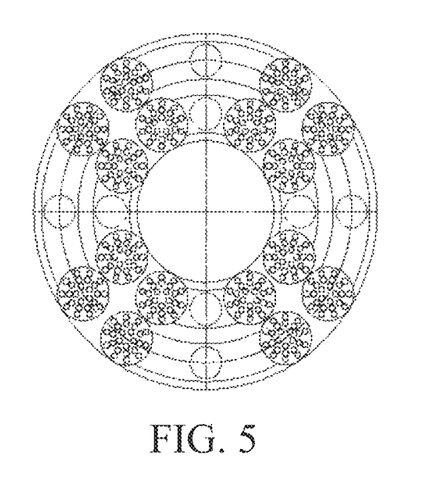
FIG. 5 is a top view of four brush units of the device for removing burrs from a back cavity of wheel.

A brush unit comprises the outer ring brush system, the inner ring brush system and the synchronous movement system. The device comprises four brush units uniformly distributed in the circumferential direction.

An upper lifting drive system comprises: four upper guide sleeves 106 which are fixed above a top plate of the frame 1; four upper guide pillars 104 which are fitted with the four upper guide sleeves 106 and are fixed above the upper lifting plate 102; two second upper cylinder 105 which are also fixed above the top plate of the frame 1, with output ends of the two second upper cylinder being articulated with an upper part of the upper lifting plate 102; the upper fixed plate 100 which is mounted below the upper lifting plate 102 through the upper rotating ring 101; the upper servo motor 103 which is fixed above the upper lifting plate 102, with an output end of the upper servo motor being connected to an upper part of the upper fixed plate 100; the left sliding plate 99 and the right sliding plate 107 which are respectively mounted below the upper fixed plate 100 through the upper guide rail 98; the upper gear 95 which is fixed below the upper fixed plate 100; the upper racks 96 which are fixed to the left sliding plate 99 and the right sliding plate 107 respectively and meshes with the upper gear 95; the first upper cylinder 97 which is fixed below the upper fixed plate 100, with an output end of the first upper cylinder being connected to the left sliding plate 99; and two clamping block 94 which are respectively fixed below the left sliding plate 99 and the right sliding plate 107.

During operation, the first upper cylinder 97 drives the four clamping block 94 to synchronously clamp a wheel through the upper guide rail 98, the upper gear 95 and the upper racks 96; the second upper cylinder 105 lifts the wheel to separate from a roller bed through the upper guide pillars 104 and the upper guide sleeves 106; the upper servo motor 103 drives the clamped wheel to rotate through the upper rotating ring 101.

The lower servo motor 111 drives the first lower spline sleeve 11 and the first lower spline shaft 10 to rotate through the first lower pulley 9, the fourth lower pulley 110 and the second lower synchronous belt 109; the first lower cylinder 7 drives the first lower spline shaft 10 to rise, and the first lower anti-rotation pin 14 cooperates with the open slot at the lower end of the second lower shaft 15 to drive the second lower shaft 15 and the lower gear 17 to rotate; the positions of the four brush units can be synchronously adjusted through the meshing of the lower gear 17 and the lower racks 108 according to the size of a wheel flange.

The left servo motor 30 can drive the left spline sleeve 38 to rotate through the first left pulley 31, the second left pulley 35 and the first left synchronous belt 33; the left spline sleeve 38 drives the fourth left pulley 52 to rotate; the fourth left pulley 52 simultaneously drives the first left brush 49 and the second left brush 55 to rotate through the third left pulley 44, the fifth left pulley 58 and the second left synchronous belt 45; the left spline sleeve 38 cooperates with the left spline shaft 37 to drive the left spline shaft 37 to rotate; the first left cylinder 32 drives the left spline shaft 37 to rise, so that the left anti-rotation pin 53 cooperates with the open slot at the lower part of the left clamping block 54; the second left bracket 50 and the left rotating ring 41 drive the left rotating plate 51 to rotate, so that the positions of the first left brush 49 and the second left brush 55 can be accurately adjusted according to the size of the wheel; after the positions are adjusted, the second left cylinder 39 drives the left pressing claw 42 to press the upper end face of the flange below the second left bracket 50 so as to fix the adjusted positions of the first left brush 49 and the second left brush 55.

The right servo motor 89 can drive the right spline sleeve 81 to rotate through the first right pulley 88, the second right pulley 84 and the first right synchronous belt 86; the right spline sleeve 81 drives the fourth right pulley 67 to rotate; the fourth right pulley 67 can simultaneously drive the first right brush 70 and the second right brush 64 to rotate through the third right pulley 75, the fifth right pulley 61 and the second right synchronous belt 74; the right spline sleeve 81 cooperates with the right spline shaft 82 to drive the right spline shaft 82 to rotate; the first right cylinder 87 drives the right spline shaft 82 to rise, so that the right anti-rotation pin 66 cooperates with the open slot below the right clamping block 65; the second right bracket 69 and the right rotating ring 78 drive the right rotating plate 68 to rotate, so that the positions of the first right brush 70 and the second right brush 64 can be accurately adjusted according to the size of the wheel; after the positions are adjusted, the second right cylinder 80 drives the pressing claw 77 to press the upper end face of the flange below the second right bracket 69 so as to fix the adjusted positions of the first right brush 70 and the second right brush 64.

Figure 6:
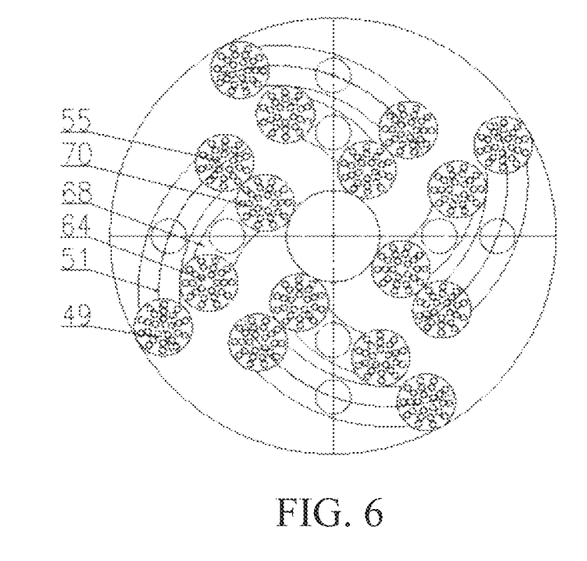
FIG. 6 is a top view of the device for removing burrs from a back cavity of wheel after the sizes of the four brush units are adjusted.

The second lower pulley 13 drives the third lower pulley 21 and the second lower spline sleeve 22 to rotate through the first lower synchronous belt 5; the second lower spline sleeve 22 drives the second lower spline shaft 20 to rotate; the second lower cylinder 18 drives the second lower spline shaft 20 to rise, and the second lower anti-rotation pin 25 cooperates with the open slot at the lower end of the fourth lower shaft 93; the second lower spline shaft 20 drives the fourth lower shaft 93 and the left gear 60 to rotate; the left gear 60 meshes with the left racks 59 to adjust the positions of the outer ring brush system and the inner ring brush system.

The third lower cylinder 112 drives the four rotating first left brush 49, second left brush 55, first right brush 70 and second right brush 64 to rise through the lower guide pillars 2 and the lower guide sleeves 3, and when the brush contact the back cavity of the wheel, the brush can polish and remove burrs from the back cavity.

The invention claimed is:

1. A device for removing burrs from a back cavity of a wheel, comprising:
a frame, lower guide pillars, lower guide sleeves, a lower fixed plate, a first lower synchronous belt, a lower lifting plate, a first lower cylinder, a first lower rotary joint, a first lower pulley, a first lower spline shaft, a first lower spline sleeve, a first lower bearing block, a second lower pulley, a first lower anti-rotation pin, a second lower shaft, a second lower bearing block, a lower gear, second lower cylinders, second lower rotary joints, second lower spline shafts, a third lower pulley, second lower spline sleeves, a third lower bearing block, a lower bracket, a second lower anti-rotation pin, a first lower left guide rail, a second lower left guide rail, a first lower bottom plate, a left support block, a left servo motor, a first left pulley, a first left cylinder, a first left synchronous belt, a left rotary joint, a second left pulley, a first left bracket, a left spline shaft, a left spline sleeve, a second left cylinder, a left fixed plate, a left rotating ring, a left pressing claw, a first left bearing block, a third left pulley, a second left synchronous belt, a second left shaft, a second left bearing block, a left bearing, a first left brush, a second left bracket, a left rotating plate, a fourth left pulley, a left anti-rotation pin, a left clamping block, a second left brush, a third left shaft, a third left bearing block, a fifth left pulley, left racks, a left gear, a fifth right pulley, a third right bearing block, a third right shaft, a second right brush, a right clamping block, a right anti-rotation pin, a fourth right pulley, a right rotating plate, a second right bracket, a first right brush, a right bearing, a second right bearing block, a second right shaft, a second right synchronous belts, a third right pulley, a first right bearing block, a right pressing claw, a right rotating ring, a right fixed plate, a second right cylinder, a right spline sleeves, a right spline shaft, a first right bracket, a second right pulley, a right rotary joints, a first right synchronous belts, a first right cylinder, a first right pulley, a right servo motor, a right support block, a second right lower guide rail, a fourth lower bearing block, a fourth lower shaft, clamping blocks, an upper gear, upper racks, a first upper cylinder, an upper guide rail, a left sliding plate, an upper fixed plate, an upper rotating ring, an upper lifting plate, an upper servo motor, upper guide pillars, second upper cylinders, upper guide sleeves, a right sliding plate, lower racks, a second lower synchronous belt, a fourth lower pulley, a lower servo motor and third lower cylinders;

a lower lifting synchronous movement arrangement of the device comprises four of the lower guide sleeves which are fixed on the lower fixed plate; four of the lower guide pillars which are fitted with the four lower guide sleeves and are fixed on the lower lifting plate; two of the third lower cylinders which are also fixed on the lower fixed plate, with output ends of the two third lower cylinders being articulated with a lower part of the lower lifting plate; the first lower bearing block which is fixed below the lower lifting plate; the first lower spline sleeve which is mounted inside the first lower bearing block through a first bearing; the second lower pulley which is fixed above the first lower spline sleeve; the first lower pulley which is fixed below the first lower spline sleeve; the first lower spline shaft which is fitted with the first lower spline sleeve; the first lower anti-rotation pin which is fixed above the first lower spline shaft, with a lower end of the first lower spline shaft being connected to an upper end of the first lower rotary joint; the first lower cylinder which is fixed to a bottom end of the first lower bearing block, with an output end of the first lower cylinder being connected to a lower end of the first lower rotary joint; the second lower bearing block which is fixed above the lower lifting plate; the second lower shaft which is mounted inside the second lower bearing block through a second bearing, with a lower end of the second lower shaft having an open slot that cooperates with the first lower anti-rotation pin; the lower gear which is fixed to a top end of the second lower shaft; four of the lower racks which are respectively fixed to the first lower bottom plate and simultaneously mesh with the lower gear; the lower servo motor which is fixed below the lower lifting plate through a first transition flange, with the fourth lower pulley being fixed at an output end of the lower servo motor; the first lower pulley which is connected with the fourth lower pulley through the second lower synchronous belt;

a first synchronous movement arrangement of the device comprises the third lower bearing block which is fixed below the first lower bottom plate; the second lower spline sleeves which are mounted inside the third lower bearing block through a third bearing; the third lower pulley which is fixed below the second lower spline sleeves; the second lower spline shafts, each of the second lower spline shafts cooperating with a respective one of the second lower spline sleeves; the second lower anti-rotation pin which is fixed to a top end of a respective one of the second lower spline shafts, with a lower part of each of the second lower spline shafts being connected to a top end of a respective one of the second lower rotary joints; the lower bracket which is fixed below the first lower bottom plate; the second lower cylinder, each of the second lower cylinders is fixed above a bottom plate of the lower bracket, with an output end of each of the second lower cylinders being connected to a lower part of a respective one of the second lower rotary joints; the fourth lower bearing block which is fixed above the first lower bottom plate; the fourth lower shaft which is mounted inside the fourth lower bearing block through a fourth bearing; the left gear which is fixed to a top end of the fourth lower shaft; two of the left racks which are respectively fixed to the left support block and the right support block and simultaneously mesh with the left gear, wherein a lower end of the fourth lower shaft has an open slot to cooperate with the second lower anti-rotation pin; the first lower bottom plate which is mounted to an upper end of the lower lifting plate through the first lower left guide rail; the second lower pulley and the third lower pulley being connected by the first lower synchronous belt;

an outer ring brush arrangement of the device comprises the left support block which is mounted to a top end of the first lower bottom plate through the second lower left guide rail; the left fixed plate which is fixed to an upper end of the left support block; the first left bearing block which is fixed above the left fixed plate; the left spline sleeve which is mounted inside the first left bearing block through a fifth bearing; the fourth left pulley which is fixed to a top end of the left spline sleeve; the second left pulley which is fixed to a lower end of the left spline sleeve; the left spline shaft which cooperates with the left spline sleeve; the left anti-rotation pin which is fixed to a top end of the left spline shaft, with a lower end of the left spline shaft being connected to a top end of the left rotary joint; the first left bracket which is fixed below the left fixed plate; the first left cylinder which is fixed above a bottom plate of the left fixed plate, with an output end of the first left cylinder being connected with a lower end of the left rotary joint; the left servo motor which is fixed below the left fixed plate through a second transition flange, with the first left pulley being fixed to an output end of the left servo motor, wherein the first left pulley and the second left pulley are connected by the first left synchronous belt; the second left bracket which is mounted to a top end of the left fixed plate through the left rotating ring; the second left cylinder which is fixed to the left fixed plate, with the left pressing claw being fixed to an output end of the second left cylinder; the left pressing claw which cooperates with an upper end face of a first flange below the second left bracket; the left rotating plate which is fixed to a top end of the second left bracket; the left clamping block which is fixed to a lower end of the left rotating plate and has an open slot to cooperate with the left anti-rotation pin; the second left bearing block which is fixed to a left side of the left rotating plate; the second left shaft which is mounted inside the second left bearing block through the left bearing; the first left brush which is fixed to an upper end of the second left shaft; the third left pulley which is fixed to a lower end of the second left shaft; the third left bearing block which is fixed to a right side of the left rotating plate; the third left shaft which is mounted inside the third left bearing block through a sixth bearing; the second left brush which is fixed above the third left shaft; the fifth left pulley which is fixed below the third left shaft, wherein the third left pulley, the fourth left pulley and the fifth left pulley are connected by the second left synchronous belt;

an inner ring brush arrangement of the device comprises the right support block which is mounted above a right side of the first lower bottom plate through the second right lower guide rail; the right fixed plate which is fixed above the right support block; the first right bearing block which is fixed above the right fixed plate; the right spline sleeve which is mounted inside the first right bearing block through a seventh bearing; the fourth right pulley which is fixed above the right spline sleeve; the second right pulley which is fixed below the right spline sleeve; the right spline shaft which cooperates with the right spline sleeve; the right anti-rotation pin which is fixed to a top end of the right spline shaft, with a lower end of the right spline shaft being connected to an upper end of the right rotary joint; the first right bracket which is fixed below the right fixed plate; the first right cylinder which is fixed above a bottom end of the first right bracket, with an output end of the first right cylinder being connected to a lower end of the right rotary joint; the right servo motor which is fixed to a lower end of the right fixed plate through a third transition flange, with the first right pulley being fixed to an output end of the right servo motor; the first right pulley and the second right pulley being connected by the first right synchronous belt; the second right bracket which is mounted above the right fixed plate through the right rotating ring; the second right cylinder which is fixed to a right side of the right fixed plate; the right pressing claw which is fixed to an output end of the second right cylinder and cooperates with an upper end face of a second flange below the second right bracket; the right rotating plate which is fixed to a top end of the second right bracket; the right clamping block which is fixed to a lower end of the right rotating plate, with a lower part of the right clamping block having an open slot to cooperate with the right anti-rotation pin; the third right bearing block which is fixed to a left side of the right rotating plate; the third right shaft which is mounted inside the third right bearing block through an eighth bearing; the second right brush which is fixed to a top end of the third right shaft; the fifth right pulley which is fixed below the third right shaft; the second right bearing block which is fixed to a right side of the right rotating plate; the second right shaft which is mounted inside the second right bearing block through the right bearing; the first right brush which is fixed to a top end of the second right shaft; the third right pulley which is fixed below the second right shaft, wherein the fifth right pulley, the fourth right pulley and the third right pulley are connected by the second right synchronous belt;

a brush unit of the device comprises the outer ring brush arrangement, the inner ring brush arrangement and the first synchronous movement arrangement, wherein the device comprises four brush units uniformly distributed in a circumferential direction; and an upper lifting drive arrangement of the device comprises four of the upper guide sleeves which are fixed above a top plate of the frame; four of the upper guide pillars which are fitted with the four upper guide sleeves and are fixed above the upper lifting plate; two of the second upper cylinders which are also fixed above the top plate of the frame, with output ends of the two second upper cylinders being articulated with an upper part of the upper lifting plate; the upper fixed plate which is mounted below the upper lifting plate through the upper rotating ring; the upper servo motor which is fixed above the upper lifting plate, with an output end of the upper servo motor being connected to an upper part of the upper fixed plate; the left sliding plate and the right sliding plate which are respectively mounted below the upper fixed plate through the upper guide rail; the upper gear which is fixed below the upper fixed plate; the upper racks which are fixed to the left sliding plate and the right sliding plate respectively and mesh with the upper gear; the first upper cylinder which is fixed below the upper fixed plate, with an output end of the first upper cylinder being connected to the left sliding plate; and two of the clamping block which are respectively fixed below the left sliding plate and the right sliding plate.

\* \* \* \* \*